United States Patent
Bouthillier et al.

[11] Patent Number: 6,021,497
[45] Date of Patent: Feb. 1, 2000

[54] SECURED NETWORK SYSTEM

[75] Inventors: Stephen W. Bouthillier; Ross E. Seybold; Sydney R. Blowers, all of Ridgecrest, Calif.; Robert V. Sulkowski, Jr., Houston; Randall P. Morse, Grove City, both of Pa.

[73] Assignee: The United States of America as represented by the Secretary of the Navy, Washington, D.C.

[21] Appl. No.: 09/035,409

[22] Filed: Feb. 10, 1998

Related U.S. Application Data

[63] Continuation-in-part of application No. 08/919,180, Aug. 15, 1997.
[51] Int. Cl.[7] .................................................. G06F 11/00
[52] U.S. Cl. ............................................. 713/202; 380/23
[58] Field of Search ................................. 713/202, 200, 713/201; 364/286.4, 286.5, 286.6; 340/825.34; 380/4, 3, 21, 23, 25; 711/163

[56] References Cited

U.S. PATENT DOCUMENTS

| | | | |
|---|---|---|---|
| 4,910,775 | 3/1990 | Yves et al. | 380/25 |
| 5,048,085 | 9/1991 | Abraham et al. | 380/23 |
| 5,148,481 | 9/1992 | Abraham et al. | 380/46 |
| 5,448,638 | 9/1995 | Johnson et al. | 380/23 |
| 5,546,591 | 8/1996 | Wurzburg et al. | 395/750 |
| 5,720,035 | 2/1998 | Allegre et al. | 395/200.06 |
| 5,745,391 | 4/1998 | Topor | 364/707 |
| 5,832,209 | 11/1998 | Krantz | 345/182.1 |
| 5,832,228 | 11/1998 | Holden et al. | 395/200.55 |
| 5,841,868 | 11/1998 | Helbig, Sr. | 380/25 |
| 5,854,891 | 12/1998 | Postlewaite et al. | 395/188.01 |
| 5,859,968 | 1/1999 | Brown et al. | 395/186 |

*Primary Examiner*—Robert W. Beausoliel, Jr.
*Assistant Examiner*—Nadeem Iqbal
*Attorney, Agent, or Firm*—David S. Kalmbaugh

[57] ABSTRACT

A secured network system which will allow only authorized users of the secured network system to access classified data provided by a secured network server. The secured network system includes a readykey controller which has connected thereto a plurality of card readers. A user of the secured network system inserts a microchip embedded card into one of the card readers which then provides an authorization signal to the readykey controller indicating that the user is authorized to use one of a plurality of computers within the secured network system to receive and process classified data. The readykey controller sends an enable signal to a data relay switch enabling a data line associated with the card reader and the computer selected by the user allowing classified data to be transmitted from the secured network server through the data relay switch to the selected computer. Each of the three computers also has a power relay switch connected thereto which is activated by the readykey controller whenever authorization to activate the computer is provided to the readykey controller from another of the plurality of card readers.

13 Claims, 7 Drawing Sheets

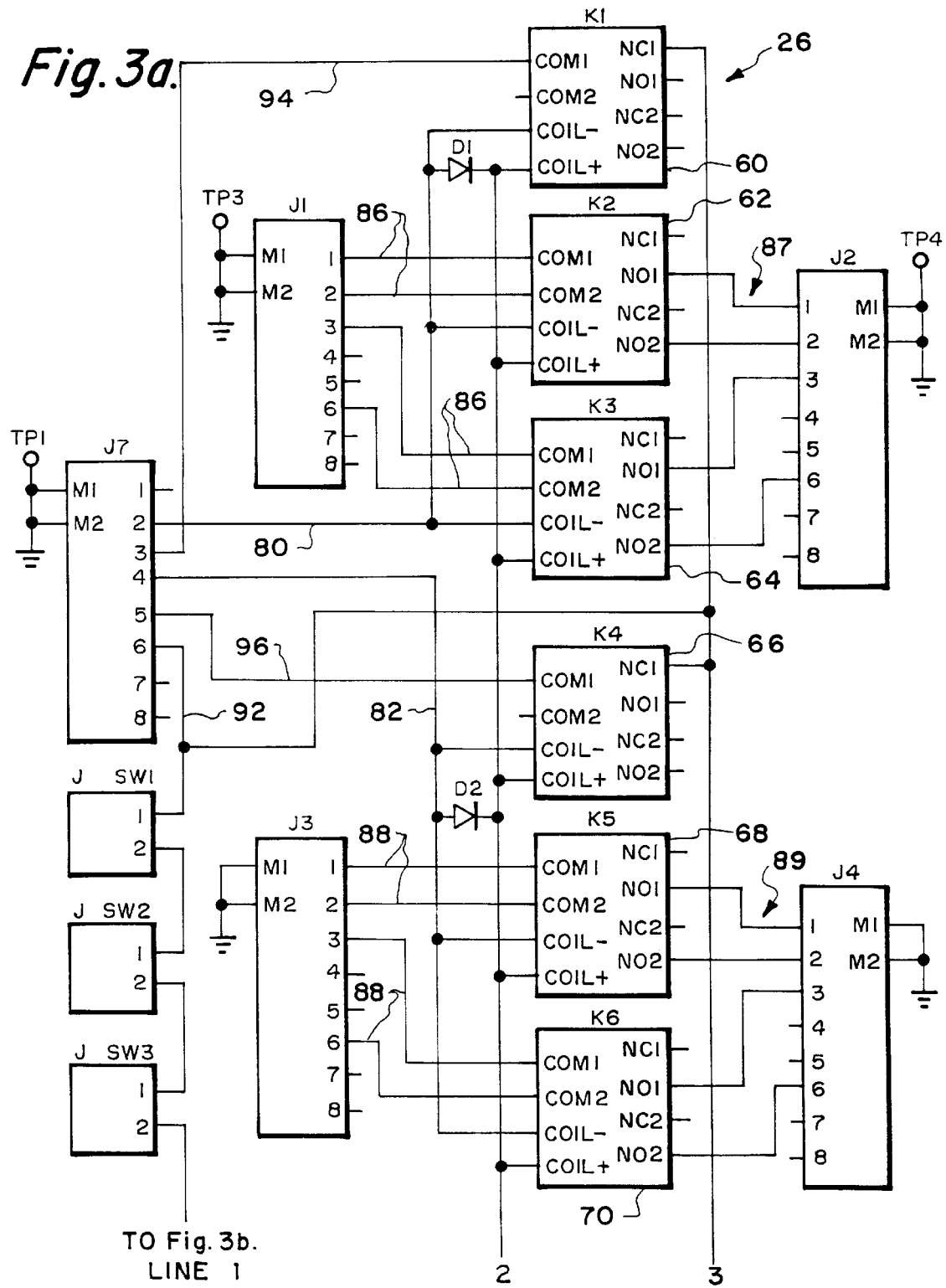

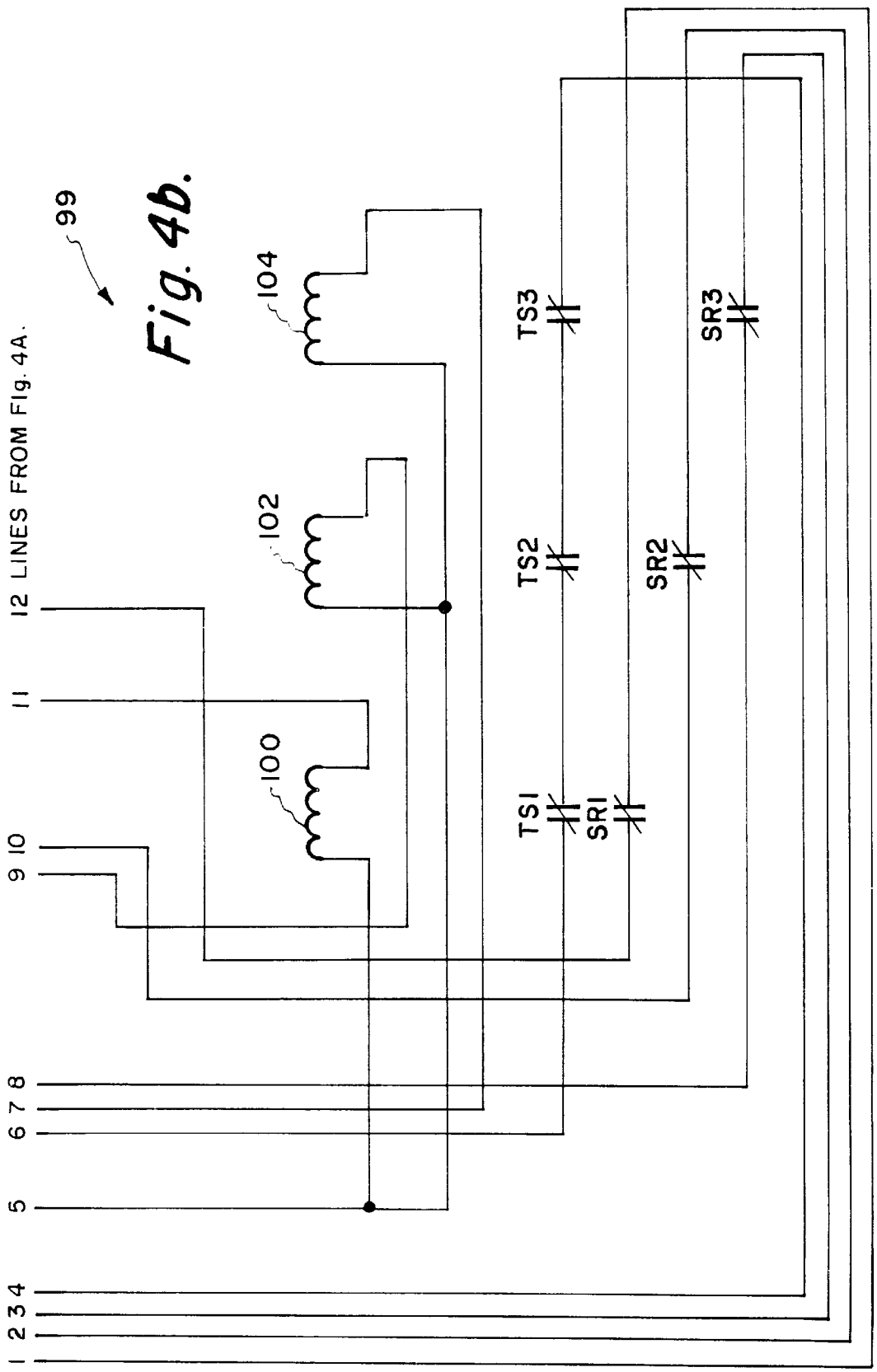

SECURED NETWORK SYSTEM

This application is a continuation-in-part of U.S. patent application Ser. No. 08/919,180, filed Aug. 15, 1997.

BACKGROUND OF THE INVENTION

1. Field of the Invention

The present invention relates generally to secured network systems. More particularly, the present invention relates to a secured network system which allows multiple users with proper authorization to access classified data provided by a secured network server and unclassified data provided by an unsecured network server from their personal computer.

2. Description of the Prior Art

In the past computer security for the military services and the intelligence agencies has been provided by a variety of commercially available computer programs which are adapted for use with a variety of microcomputers such as DOS based operating system personal computers and Apple Macintosh personal computers. These computer programs are adapted to provide access control to a computer's data or the data base of a Local Area Network that is coupled to the computer.

Computer security programs often reside in the memory of the computer's central processing unit. Placing computer security programs in the computer's memory slows the computer's processing time because the computer must perform repetitive identification and auditing tasks stored in the computer's memory. In addition, conflicts between security software and the computer operating system or other computer software used by the computer may result in the computer crashing which renders the computer unusable.

Recently microchip embedded cards or "Smart Cards" have been used with computer security software to insure that classified data is not accessible to an individual who is not authorized to access the classified data. However, "Smart Cards" also rely on performing authentication and auditing functions which are stored in the computer's memory.

Accordingly, there is a need for a secure network system which will allow only authorized individuals to access classified data, but will not require the use of computer memory to perform authentication and auditing functions associated with the accessing of classified data.

SUMMARY OF THE INVENTION

The present invention overcomes some of the disadvantages of the prior art including those mentioned above in that it comprises a relatively simple yet highly effective secured network system which will allow only an authorized user of the secured network system to access classified data. The secured network system includes a readykey controller which has connected thereto a first card reader and a power relay switch. The user of the secured network system inserts a microchip embedded card into the first card reader. The first card reader then transmits a first electrical authorization signal to the readykey controller indicating that the user is authorized to use a personal computer and its associated monitor for receiving and processing classified data. The readykey controller, in response to the first electrical authorization signal, supplies a first enable signal to a power relay switch activating the power relay switch which couples the computer's power supply to an external power source.

The secured network system also allows the user to receive and process classified data, by setting a manual A/B secured network switch to a predetermined position which allows a secured network server to be connected to the personal computer. The user next inserts his proximity card into a second card reader which then transmits a second electrical authorization signal to the readykey controller indicating that the user is authorized to receive and process classified data from the secured network server. The readykey controller, responsive to the second authorization signal, sends a second enable signal to a data relay switch. The second enable signal enables the data relay switch connecting the secured network switch to the secured network server via the data relay switch which allows for the transmission of classified data between the secured network server and the personal computer.

The secured network system of the present invention may be adapted for use with multiple computers. For example, three computers may be connected by first, second and third data lines through a data relay switch to a secured network server to allow for the controlled transmission of classified data from the secured network server through the data relay switch to each of the three computers. The data relay switch is also connected to a readykey controller which is, in turn, connected to a plurality of card readers. Whenever one of the card readers provides an authorization signal to the readykey controller, the readykey controller sends an enable signal to the data relay switch enabling the data line associated with the card reader and a selected computer which allows classified data to be transmitted from the secured network server through the data relay switch to the computer selected for receipt of the data.

Each of the three computers also has a power relay switch connected thereto which is activated by the readykey controller whenever authorization to activate the computer is provided to the readykey controller from one of the card readers.

BRIEF DESCRIPTION OF THE DRAWINGS

FIGS. 3a and 3b are electrical schematic diagrams of the data relay switch of FIG. 1;

FIGS. 4a and 4b is an electrical schematic diagram of a secured network system which includes a power relay switch and which is adapted for use with plurality of card readers.

DETAILED DESCRIPTION OF THE PREFERRED EMBODIMENT

Figure 1:
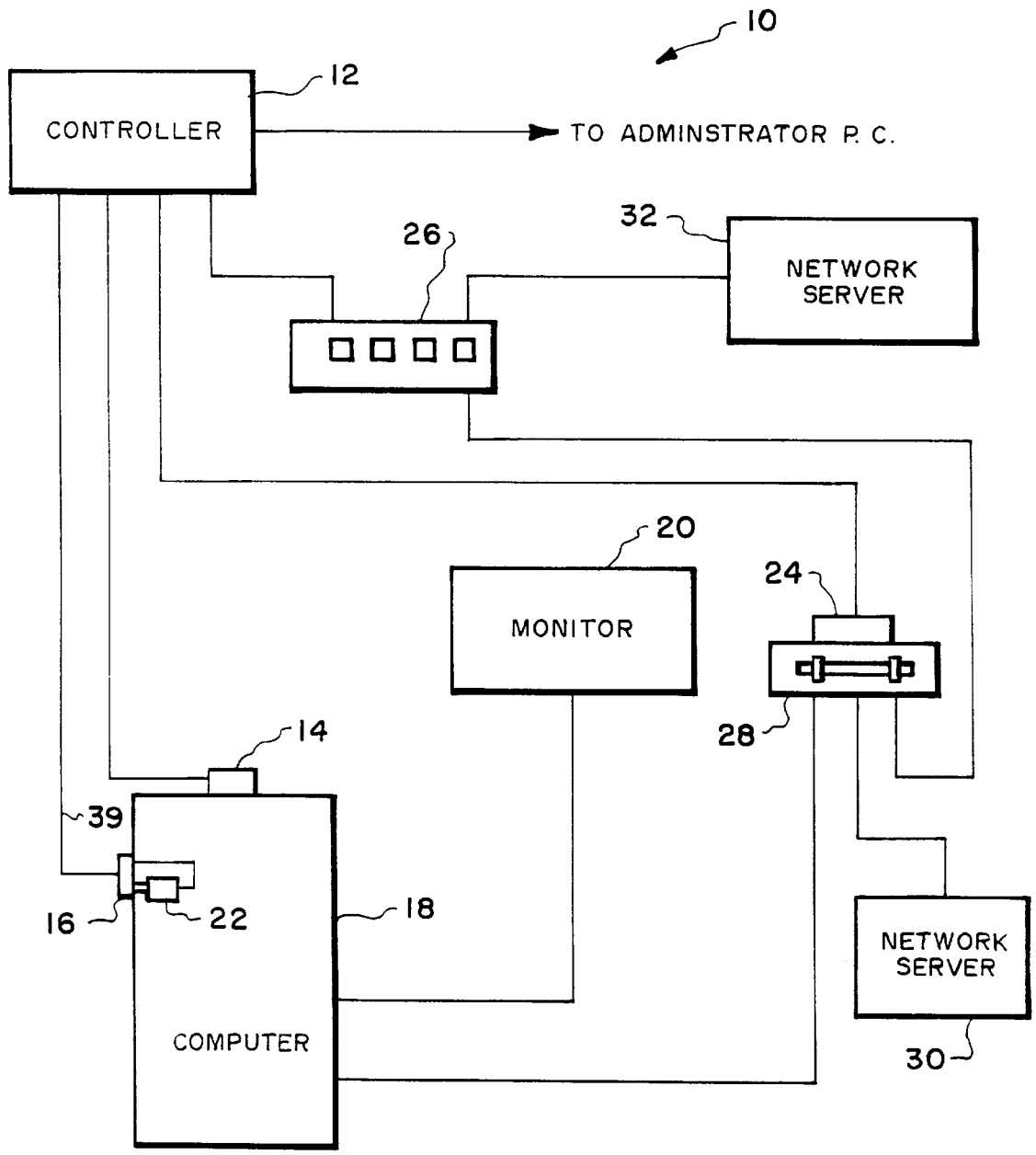
FIG. 1 is an electrical schematic diagram of a secured network system which includes power relay switch and a data relay switch.

Referring to FIG. 1 there is shown a secured network system 10 which receives and processes classified data as well as unclassified data. Secured network system 10 includes a readykey controller 12 which has connected thereto a central processing unit card reader 14 and a power relay switch 16. The user of secured network system 10 presents, that is inserts a proximity card which is a microchip embedded card into card reader 14. Card reader 14 upon receiving the microchip embedded card and verifying the card transmits an electrical authorization signal to readykey controller 12 indicating that the user is authorized to use a digital computer 18 and its associated monitor 20 for receiving and processing classified data.

The readykey controller 12 is also connected to an administrative personal computer (not illustrated) which monitors controller 12 to keep track of individuals accessing computer 18 and to insure an attempt at unauthorized access of data stored in computer 18 or available to computer 18 through a Local Area Network is not made.

Figure 2:
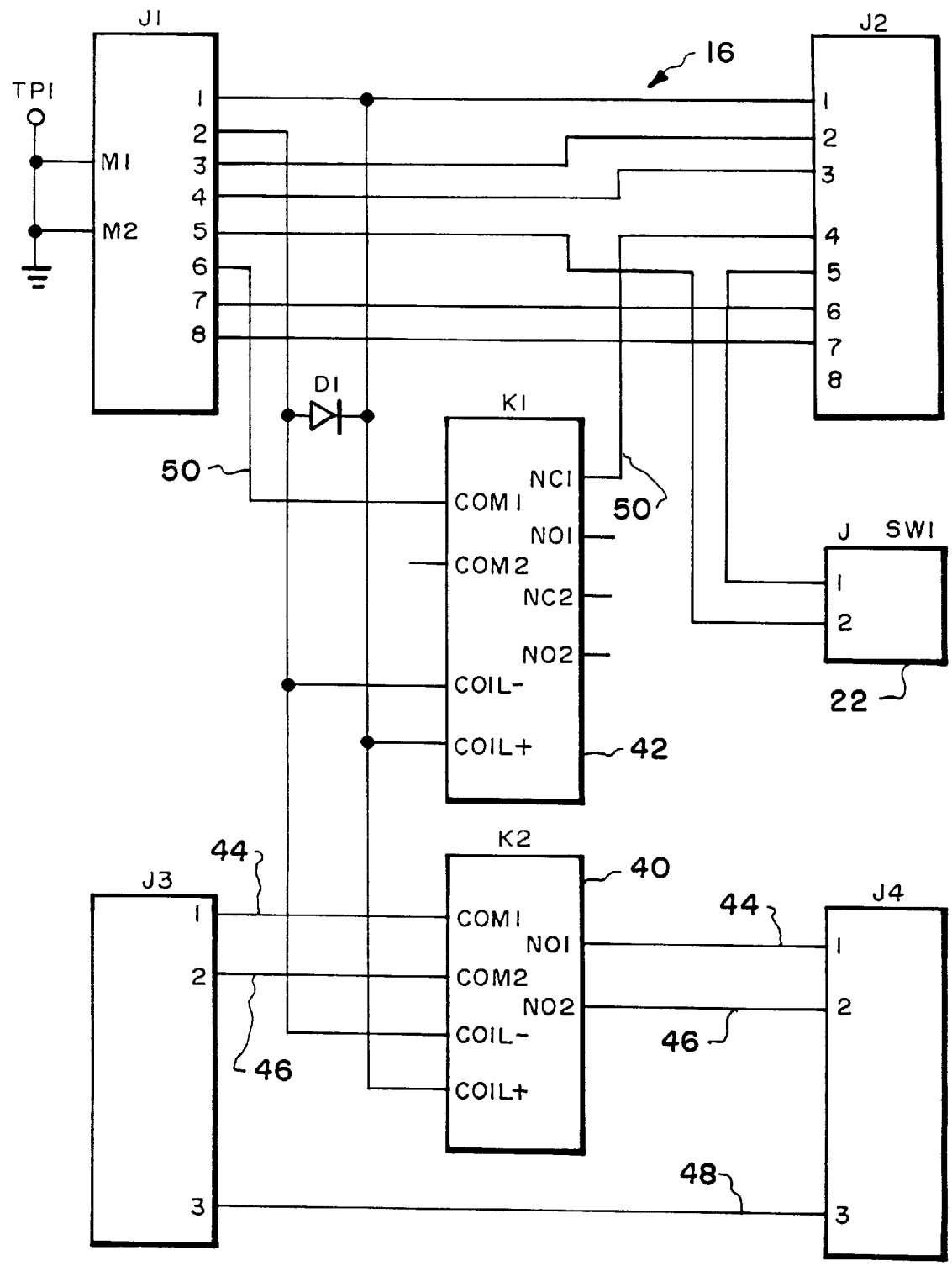
FIG. 2 is an electrical schematic diagram of the power relay switch of FIG. 1.

Referring now to FIGS. 1 and 2, readykey controller 12, in response to the electrical authorization signal from card reader 14, supplies an enable signal via terminal J1, Pin 1 and a relay power line 39 to the positive input of the coil of a relay 40 and a relay 42. The enable signal energizes the coil of relay 40 closing normally open contacts 1 and 2 of relay 40. The enable signal also energizes the coil of relay 42 opening normally closed contact 1 of relay 42.

Closing normally open contacts 1 and 2 of relay 40 connects power line 44, and neutral line 46 from terminal J3 of power relay switch 16 through relay 40 to terminal J4 of switch 16. Terminal J4 of power relay switch 16 is connected to the power supply for computer 18 so that closure of normally open contacts 1 and 2 of relay 40 provides 120 VAC from an external source to the power supply of computer 18, thereby activating computer 18 which allows the user of computer 18 to receive and process data. Line 48 between terminals J3 and J4 provides a ground for computer 18.

Line 50 which connects pin 6, terminal J1 of switch 16 to pin 4, terminal J2 of switch 16 via normally closed contact 1 of relay 42 is a status or test line. When normally closed contact 1 of relay 42 is closed a test signal is supplied to readykey controller 12 indicating that power relay switch 16 is off and computer 18 is not operational. Opening normally closed contact 1 of relay 42 results in a test signal being provided to readykey controller 12 which indicates that power relay switch 16 is on and computer 18 is operational.

Power relay switch 16 includes a tamper switch 22 which has its terminals 1 and 2 connected through terminal J1 and terminal J2 of power relay switch 16 to readykey controller 12. Unauthorized removal of the power relay switch 16 from computer 18 activates tamper switch 22 sending an electrical signal to readykey controller 12 which indicates that an unauthorized person has attempted to bypass power relay ID switch 16.

Referring again to FIG. 1, secured network system 10 includes a manual A/B switch 28 which allows the user of computer 18 to receive unclassified data from a unsecured network server 30 and classified data from a secured network server 32. The manual A/B switch 28 used in secured network system 10 is fully disclosed in U.S. patent application Ser. No. 08/687,102, "Shielded Computer Network Switch", filed Jul. 22, 1996, by Stephen W. Bouthillier.

When switch 28 is set at a first position such that unsecured network server 30 is connected to computer 18, the user of computer 18 may receive and process unclassified data from unsecured network server 30.

When the user of secured network system 10 needs to receive and process classified data, manual A/B switch 28 is set at a second position allowing secured network server 32 to be connected to computer 18. The user next inserts his proximity card into a network card reader 24 which then transmits an electrical authorization signal to readykey controller 12 indicating that the user is authorized to receive and process classified data from secured network server 32. Readykey controller 12, responsive to the authorization signal from network card reader 24 sends an enable signal to a data relay switch 26. This enable signal to enables data relay switch 26 connecting secured network server 32 to computer 18 through data relay switch 26 and manual A/B switch 28.

Figure 3B:
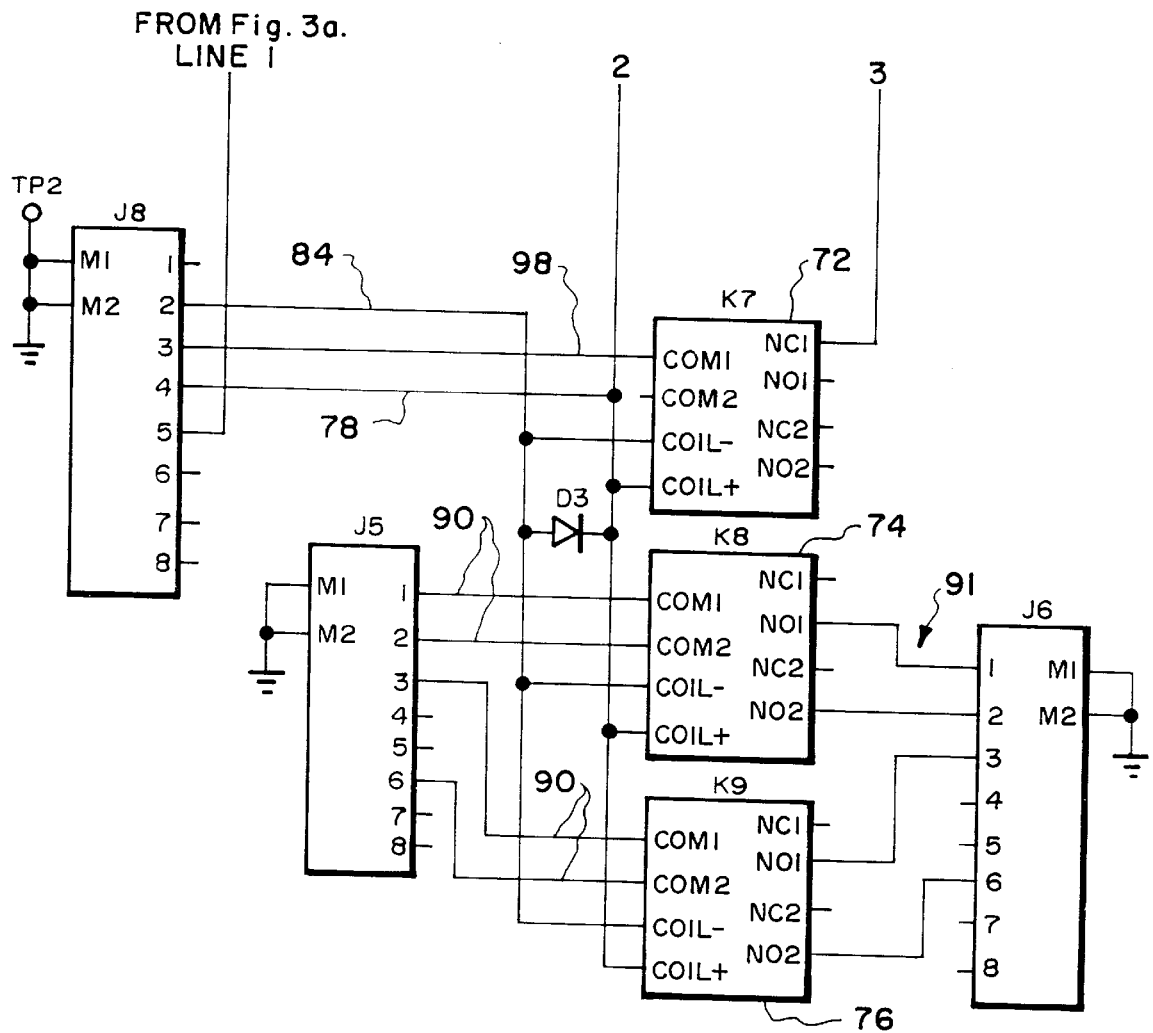

Referring to FIGS. 1, 3a and 3b, there is shown in FIGS. 3a and 3b a detailed electrical schematic diagram of data relay switch 26. Data relay switch 26 includes three sets of three relays 60, 62 and 64; 66, 68 and 70; 72, 74 and 76 which allow three computers to be connected to secured network server 32.

Secured network server 32 is connected to computer 18 through relays 60, 62 and 64 of data relay switch 26. Readykey controller 12 supplies an enable signal via terminal J7, Pin 2 of switch 26 and enable line 80 to the negative input of the coils of relays 60, 62 and 64. The enable signal energizes the coil of each relay 62 and 64 which closes the normally open contacts 1 and 2 of each relay 62 and 64. Closing the normally open contacts 1 and 2 of each relay 62 and 64 completes a data path for the four data lines 86 of a first data channel 87 between secured network server 32 and computer 18 allowing for the transfer of classified data between secured network server 32 and computer 18.

Data relay switch 26 also has a status or test line 94 which indicates the status of the data path or the four data lines 86 between secured network server 32 and computer 18. When the coil of relay 60 is de-energized, normally closed contact 1 of relay 60 is closed sending a test signal to readykey controller 12 via status line 94 which indicates that the data path between secured network server 32 and computer 18 is inactive. Energizing the coil of relay 60 opens normally closed contact 1 of relay 60 which indicates that the data path between secured network server 32 and computer 18 is active.

The second set of relays 66, 68 and 70 allows for the transfer of classified data between secured network server 32 and a second computer (not illustrated) whenever a second enable signal is supplied by readykey controller 12 to the coils of relays 66, 68 and 70 via enable line 82. Energizing the coil of each relay 66 and 68 completes a data path for the four data lines 88 of a second data channel 89 between secured network server 32 and the second computer allowing for the transfer of classified data between secured network server 32 and the second computer.

Data relay switch 26 has a status or test line 96 which indicates the status of the data path or the four data lines 88 between secured network server 32 and the second computer. When the coil of relay 66 is de-energized, normally closed contact 1 of relay 66 is closed sending a second test signal to readykey controller 12 via status line 96 which indicates that the data path between secured network server 32 and the second computer is inactive. Energizing the coil of relay 66 opens normally closed contact 1 of relay 66 which indicates that the data path between secured network server 32 and the second computer is active.

In a like manner, the third set of relays 72, 74 and 76 allows for the transfer of classified data between secured network server 32 and a third computer (not illustrated) whenever a third enable signal is supplied by readykey controller 12 to the coils of relays 72, 74 and 76 via enable line 84. Energizing the coil of each relay 72 and 74 completes a data path for the four data lines 90 of a third data channel 91 between secured network server 32 and the third computer allowing for the transfer of classified data between secured network server 32 and the third computer.

Data relay switch 26 has a status or test line 98 which indicates the status of the data path or the four data lines 90 between secured network server 32 and the third computer. When the coil of relay 72 is de-energized, normally closed contact 1 of relay 72 is closed sending a third test signal to readykey controller 12 via status line 98 which indicates that the data path between secured network server 32 and the third computer is inactive. Energizing the coil of relay 72 opens normally closed contact 1 of relay 72 which indicates that the data path between secured network server 32 and the third computer is active.

Referring now to FIGS. 1, 3a, 3b, and 5, there is shown a data relay switch control circuit 101 which includes three card readers 120, 122 and 124 associated with respectively first, second and third data channels 87, 89 and 91 of the secured network system 10 of FIGS. 3a and 3b. Terminals 112, 114, 116 and 118 are terminals on readykey controller 12. Terminal 118 connects card reader 120 to readykey controller 12, terminal 116 connects card reader 122 to readykey controller 12 and terminal 114 connects card reader 124.

Each terminal 114, 116 and 118 and its associated card reader 124, 122 and 120 includes a data line SIG which is used to transfer data between readykey controller 12 and card readers 124, 122 and 120.

The data relay switch control circuit 101 has a control relay contact RC4 which is controlled by readykey controller 12. When readykey controller 12 closes control relay contact RC4, channel 87, 89 or 91 on data relay switch 26 (FIGS. 3a and 3b) can be enabled respectively by control relay contacts RC1, RC2 or RC3. Control relay contacts RC1, RC2 or RC3 are also controlled by readykey controller 12.

When, for example, data is to be transferred from secured network 32 to computer 18 via data channel 87, ready controller 12 will close control relay contact RC1. The closure of contact RC1 completes an electrical path from the positive terminal L+ of the 12 VDC power supply through coil 106 and diode D5 to ground.

Figure 5:
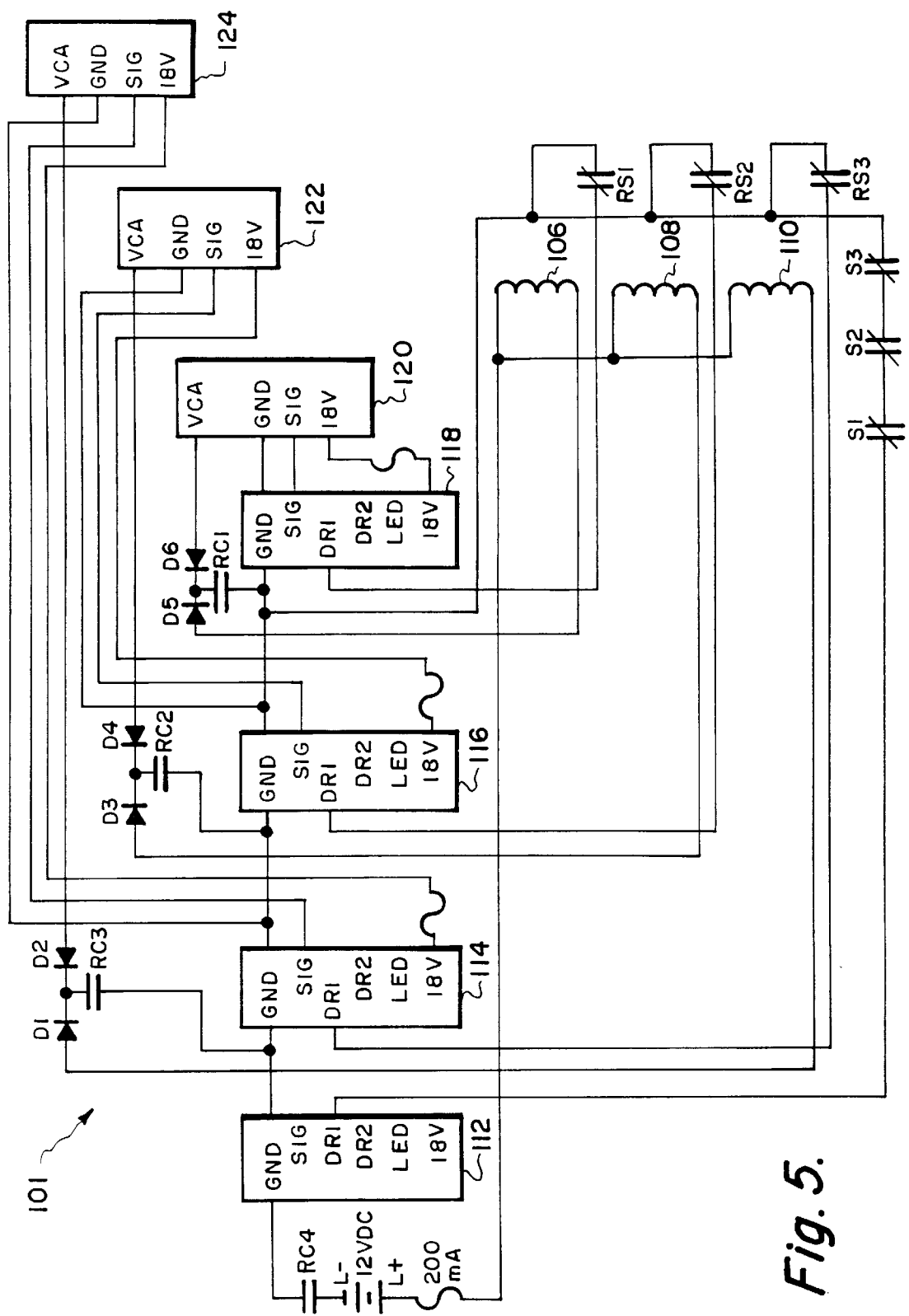
FIG. 5 is an electrical schematic diagram of a secured network system which includes a data relay switch and which is adapted for use with plurality of card readers.

At this time it should be noted that coil 106 of FIG. 5 represents the coils for relays 60, 62 and 64 of FIG. 3 which must be closed to allow for data transfer through data relay switch 26 via data channel 87. Similarly, coil 108 of FIG. 5 represents the coils for relays 66, 68 and 70 of FIG. 3 which must be closed to allow for data transfer through data relay switch 26 via data channel 89. Likewise, coil 110 of FIG. 5 represents the coils for relays 72, 74 and 76 of FIG. 3 which must be closed to allow for data transfer through data relay switch 26 via data channel 91.

The closure of contact RC1 by readykey controller 12 energizes coil 106 closing the normally open contacts 1 and 2 of relays 62 and 64. Closing the normally open contacts 1 and 2 of relays 62 and 64 completes the data path for the four data lines 86 of data channel 87 allowing for the transfer of classified data between secured network server 32 and computer 18.

The closure of contact RC2 by readykey controller 12 energizes coil 108 closing the normally open contacts 1 and 2 of relays 68 and 70 completing the data path for the four data lines 88 of data channel 89. The closure of contact RC3 by readykey controller 12 energizes coil 110 closing the normally open contacts 1 and 2 of relays 74 and 76 completing the data path for the four data lines 90 of data channel 91.

Data relay switch control circuit 101 also includes three supervisory relay contacts RS1, RS2 and RS3 which are normally closed. The three supervisory relay contacts RS1, RS2 or RS3 are opened whenever their respective data channel 87, 89 or 91 is enabled. For example, when data channel 87 is enabled, coil 106 is energized which opens contact RS1. When data channel 89 is enabled, coil 108 is energized which opens contact RS2. When data channel 91 is enabled, coil 110 is energized which opens contact RS3.

Whenever readykey controller 12 detects an open circuit with respect to contact RS1, contact RS2 or contact RS3 without a valid read for its associated data channel 87, 89 or 91 then readykey controller 12 will signal an alarm.

Data relay switch control circuit 101 also includes three normally closed tamper switch contacts S1, S2 and S3 which are connected in series. When tamper switch contacts S1, S2 or S3 are closed, the front and rear cable tamper bars of the switch's associated computer are in place and the switch enclosure is fastened shut. If readykey controller 12 detects an open contact S1, S2 or S3 then readykey controller 12 signals an alarm.

Each card reader 120, 122 and 124 also includes a VCA output terminal which is coupled to red and green light emitting diode (not illustrated). The red light emitting diode indicates the card reader 120, 122 or 124 is active, while the green light emitting diode indicates that data channel 87, 89 or 91 associated with card reader 120, 122 or 124 is enabled. For example, when the green light emitting diode for card reader 120 is active, data channel 87 is enabled providing a connection to secured network server 32 for computer 18.

Closure, for example, of contact RC1 completes an electrical signal path from the VCA output terminal of card reader 120 through diode D6 and contact RC1 energizing the green light emitting diode of card reader 120.

Figure 4A:
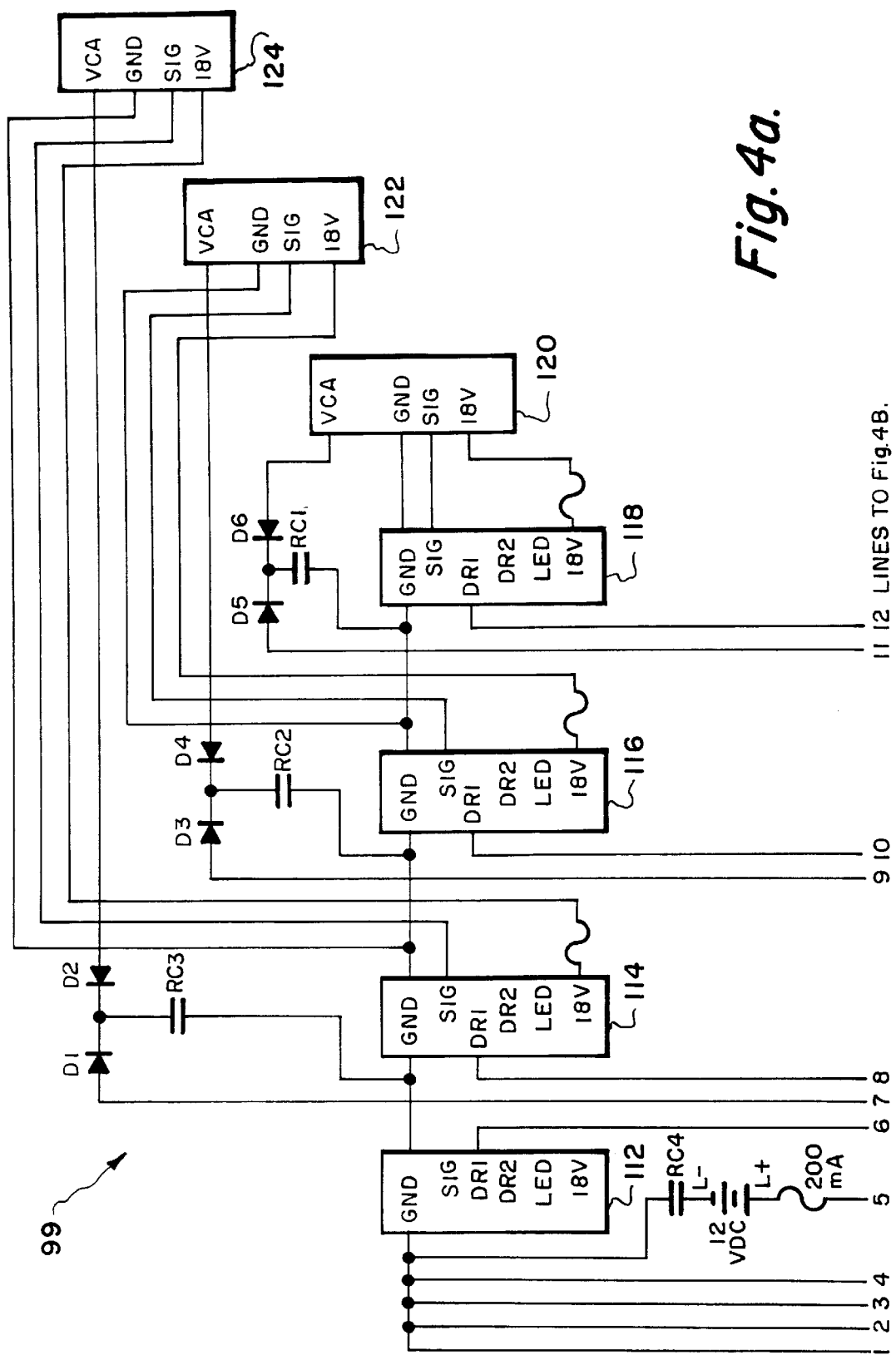

Referring to FIGS. 1, 4a and 4b, there is shown the power relay switch control circuit 99 for secured network system 10. Since the power relay switch control circuit 99 of FIGS. 4a and 4b operates in exactly the same manner as the data relay switch control circuit 101 of FIG. 5, a detailed description of the operation of power relay switch control circuit 99 will not be provided.

Circuit 99 includes three coils 100, 102 and 104 which are adapted to enable the power relay switch for three data lines and their associated computers, such as the data lines 87, 89 and 91 of FIGS. 3a and 3b. Coil 100, for example, could represent the coils for relays 40 and 42. Energizing coil 100 closes normally open contacts 1 and 2 of relay 40. Closing normally open contacts 1 and 2 of relay 40 connects power line 44, and neutral line 46 from terminal J3 of power relay switch 16 through relay 40 to terminal J4 of switch 16 thereby activating computer 18 which allows the user of computer 18 to receive and process data.

Although not illustrated the circuit of FIG. 1 would include two additional power relay switches which are identical to the power relay switch 16 when three data line (such as the data lines 87, 89 and 91) are used to provide for secured data transfer between three computers and a secured network server.

Since tamper switches TS1, TS2 and TS3 of FIG. 4b operate in exactly the same manner as tamper switches S1, S2 and S3 of FIG. 5, a detailed written description of their operation will not be provided. In a like manner, supervisory relay contacts SR1, SR2 and SR3 (FIG. 4b) operate in a manner identical to supervisory relay contacts RS1, RS2 and RS3 (FIG. 5), accordingly a detailed written description of their operation will not be provided.

The readykey controller 12 used in secured network system 10 is a Readykey K2100 Controller commercially available from Radionics of Solinas, Calif. Central processing unit card reader 14 and network card reader 24 are Readykey K2001 Touchfree proximity readers also commercially available from Radionics of Solinas, Calif. Manual A/B switch 28 is a Secure Switch Ethernet/Ethernet, Model SW456A commercially available from Black Box Corporation of Pittsburgh, Pa.

From the foregoing, it may readily be seen that the present invention comprises a new, unique and exceedingly useful secured network system for receiving and processing classified and unclassified data which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed is:

1. A secured network system comprising:
   a plurality of data processing means for receiving and processing classified data;
   a plurality of network card reader means, each of said plurality of network card reader means being adapted to receive a microchip embedded card, each of said plurality of network card reader means providing an authorization signal whenever said microchip embedded card is presented thereto;
   controller means connected to each of said plurality of network card reader means to receive said authorization signal from each of said plurality of network card reader means;
   a classified network server for providing said classified data;
   a data relay switch connected to said controller means, said data relay switch being connected to said classified network server and each of said plurality of data processing means;
   said controller means, responsive to said authorization signal from one of said plurality of network card reader means, enabling said data relay switch to provide for a data transfer from said classified network server through said data relay switch to an associated one of said plurality of data processing means allowing a user of said secured network system to process said classified data with said associated one of said plurality of data processing means;
   each of said plurality of data processing means having a power relay switch connected thereto;
   said controller means being connected to the power relay switch of each of said plurality of data processing means, said controller means being adapted to activate said power relay switch of each of said plurality of data processing means, said power relay switch of each of said plurality of data processing means when activated coupling said data processing means to an external power source.

2. The secured network system of claim 1 wherein each of said plurality of data processing means comprises a digital computer.

3. The secured network system of claim 1 wherein said controller means comprises a readykey controller.

4. The secured network system of claim 1 further comprising a plurality of central processing unit card readers, each of said plurality of central processing unit card readers being connected to said controller means, each of said plurality of central processing unit card readers being adapted to receive said microchip embedded card, each of said plurality of central processing unit card readers generating a computer access authorization signal whenever said microchip embedded card is presented thereto.

5. The secured network system of claim 1 further comprising a plurality of monitors, each of said plurality of data processing means having one of said plurality of monitors connected thereto.

6. The secured network system of claim 1 further comprising:
   a manual A/B switch connected to each of said plurality of data processing means; and
   an unclassified network server connected to said manual A/B switch and said data relay switch, said unclassified network server providing unclassified data through said manual A/B switch to said plurality of data processing means whenever said manual A/B switch is set to a first position, said manual A/B switch being adapted to pass classified data therethrough whenever said manual A/B switch is set to a second position.

7. A secured network system comprising:
   a plurality of computers for receiving and processing classified data;
   a plurality of network card readers, each of said plurality of network card readers being adapted to receive a microchip embedded card, each of said plurality of network card reader readers providing a classified access authorization signal whenever said microchip embedded card is presented thereto;
   a readykey controller connected to each of said plurality of network card readers to receive said classified access authorization signal from each of said plurality of network card readers;
   a classified network server for providing said classified data;
   a data relay switch connected to said readykey controller, said data relay switch being connected to said classified network server and each of said plurality of computers;
   said readykey controller, responsive to said classified access authorization signal from one of said plurality of network card readers, enabling said data relay switch to provide for a data transfer from said classified network server through said data relay switch to an associated one of said plurality of computers allowing a user of said secured network system to process said classified data with said associated one of said plurality of computers;
   each of said plurality of computers having a power relay switch connected thereto;
   said readykey controller being connected to the power relay switch of each of said plurality of computers;
   said readykey controller being adapted to activate said power relay switch of each of said plurality of computers;
   a plurality of central processing unit card readers, each of said plurality of central processing unit card readers being connected to said readykey controller, each of said plurality of central processing unit card readers being adapted to receive said microchip embedded card, each of said plurality of central processing unit card readers generating a computer access authorization signal whenever said microchip embedded card is presented thereto;
   said readykey controller receiving the computer access authorization signal from each of said plurality of central processing unit card readers, said readykey controller being adapted to activate said power relay switch of each of said plurality of computers in response to the computer access authorization signal from an associated one of said plurality of central processing unit card readers, said power relay switch of each of said plurality of computers when activated coupling said computer to an external power source.

8. The secured network system of claim 7 further comprising a plurality of monitors, each of said plurality of computers having one of said plurality of monitors connected thereto.

9. The secured network system of claim 7 further comprising:
   a manual A/B switch connected to each of said plurality of computers; and
   an unclassified network server connected to said manual A/B switch and said data relay switch, said unclassified network server providing unclassified data through said manual A/B switch to said plurality of computers whenever said manual A/B switch is set to a first position, said manual A/B switch being adapted to pass classified data therethrough whenever said manual A/B switch is set to a second position.

10. The secured network system of claim 7 wherein said power relay switch of each of said plurality of said digital computers includes a tamper switch connected to said readykey controller, an unauthorized removal of said power relay switch from any one of said plurality of digital computer activates said tamper switch associated therewith sending an electrical alarm signal to said readykey controller.

11. The secured network system of claim 7 wherein each of said plurality of computers comprises a digital computer.

12. A secured network system comprising:
   a plurality of digital computers for receiving and processing classified data;
   a plurality of monitors, each of said plurality of digital computers having one of said plurality of monitors connected thereto;
   a plurality of network card readers, each of said plurality of network card readers being adapted to receive a microchip embedded card, each of said plurality of network card reader readers providing a classified access authorization signal whenever said microchip embedded card is presented thereto;
   a readykey controller connected to each of said plurality of network card readers to receive said classified access authorization signal from each of said plurality of network card readers;
   a classified network server for providing said classified data;
   a data relay switch connected to said readykey controller, said data relay switch being connected to said classified network server and each of said plurality of digital computers;
   said readykey controller, responsive to said classified access authorization signal from one of said plurality of network card readers, enabling said data relay switch to provide for a data transfer from said classified network server through said data relay switch to an associated one of said plurality of digital computers allowing a user of said secured network system to process said classified data with said associated one of said plurality of digital computers;
   each of said plurality of digital computers having a power relay switch connected thereto;
   said readykey controller being connected to the power relay switch of each of said plurality of digital computers;
   said readykey controller being adapted to activate said power relay switch of each of said plurality of digital computers;
   a plurality of central processing unit card readers, each of said plurality of central processing unit card readers being connected to said readykey controller, each of said plurality of central processing unit card readers being adapted to receive said microchip embedded card, each of said plurality of central processing unit card readers generating a computer access authorization signal whenever said microchip embedded card is presented thereto;
   said readykey controller receiving the computer access authorization signal from each of said plurality of central processing unit card readers, said readykey controller being adapted to activate said power relay switch of each of said plurality of digital computers in response to the computer access authorization signal from an associated one of said plurality of central processing unit card readers, said power relay switch of each of said plurality of digital computers when activated coupling said digital computer to an external power source; and
   said power relay switch of each of said plurality of digital computers including a tamper switch connected to said readykey controller, an unauthorized removal of said power relay switch from any one of said plurality of digital computer activates said tamper switch associated therewith sending an electrical alarm signal to said readykey controller.

13. The secured network system of claim 12 further comprising:
   a manual A/B switch connected to each of said plurality of digital computers; and
   an unclassified network server connected to said manual A/B switch and said data relay switch, said unclassified network server providing unclassified data through said manual A/B switch to said plurality of digital computers whenever said manual A/B switch is set to a first position, said manual A/B switch being adapted to pass classified data therethrough whenever said manual A/B switch is set to a second position.

* * * * *